C. H. KEYES.
BRAKE SHOE.
APPLICATION FILED JAN. 20, 1919.
1,353,914.
Patented Sept. 28, 1920.
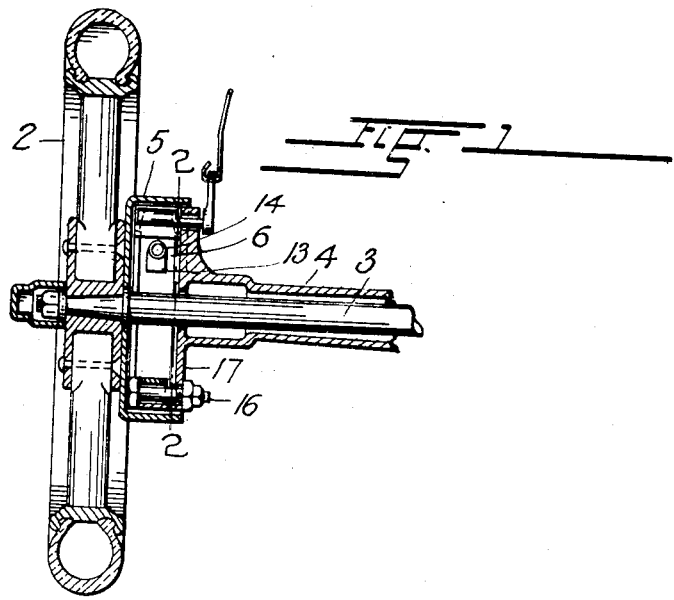
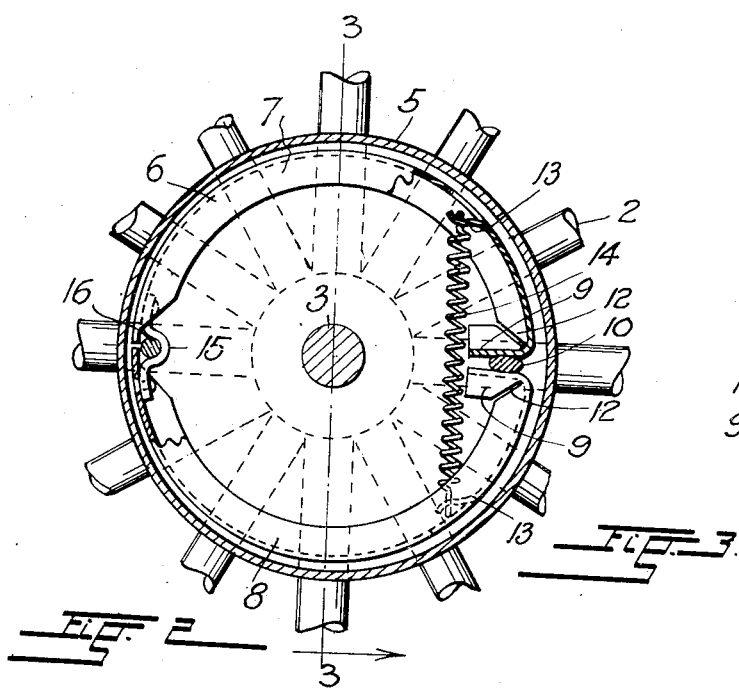
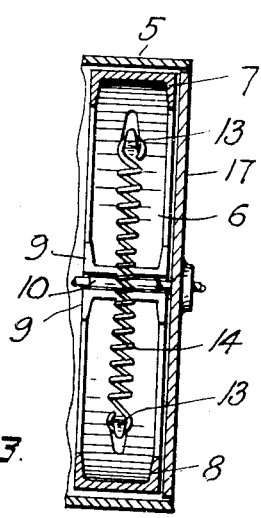
INVENTOR
C. H. KEYES
BY
ATTORNEY.

UNITED STATES PATENT OFFICE.

CHARLES H. KEYES, OF DENVER, COLORADO.

BRAKE-SHOE.

1,353,914.  Specification of Letters Patent.  Patented Sept. 28, 1920.

Application filed January 20, 1919. Serial No. 272,044.

*To all whom it may concern:*

Be it known that I, CHARLES H. KEYES, a citizen of the United States, residing at Denver, in the county of Denver and State of Colorado, have invented certain new and useful Improvements in Brake-Shoes, of which the following is a specification.

This invention relates to improvements in brake-shoes of the type used on Ford automobiles and its primary object resides in providing an expansible annular shoe of simple construction, the strength, durability and wearing qualities of which surpass those of similar shoes at present in use.

An embodiment of my invention is shown in the accompanying drawings in which like characters of reference designate corresponding parts throughout the various views and in which—

Figure 1 is a horizontal section of an automobile wheel and friction brake to which my improved shoe is applied, Fig. 2, an enlarged section taken on the line 2—2, Fig. 1, Fig. 3, a section along the line 3—3, Fig. 2.

Referring more specifically to the drawings, the reference character 2 designates one of the traction wheels of a motor-driven vehicle, the axle 3 of which extends through a stationary housing 4. A cylindrical brake-drum 5 is concentrically fastened to the hub of the wheel and a disk 17 which closes the drum at its inner side, forms an integral part of the housing 4.

An expansible annular brake-shoe 6 is mounted within the drum to frictionally engage the inner circumferential surface thereof and it is in the construction of this shoe that the improvements of my invention reside.

Brake-shoes of the type to which my invention appertains, as found on Ford automobiles, consist of a cast-iron ring which is split and weakened at opposite points to permit of its expansion and contraction. A rotary cam placed between inwardly projecting flanges at the ends of the ring, serves to expand the same into frictional contact with the surface of the brake-drum by forcing the ends apart, and coiled springs stretched across the split and the opposite weakened portion of the ring are fastened to integral hook-shaped lugs of the same for the purpose of quickly releasing the brake after the cam is turned to its inoperative position.

Incapacitation of the brakes by wear and breakage of their shoes is a common occurrence and it has been the experience of owners of Ford automobiles that the cast metal brake shoes with which the machines are originally equipped must be replaced by others after a comparatively short period of use.

My improved brake-shoe which is designed to take the place of the cast-metal shoes hereinabove described, without any alteration or readjustment of the parts with which they coöperate, is composed of two halves 7 and 8 of channel-shaped structural metal which are bent into semi-circular form with their longitudinal flanges extending inwardly.

The end portions 9 of the ring parts, between which the cam 10 is disposed, are bent inwardly after their flanges have been notched as at 12, to provide the opposite faces with which the cam engages as shown in Fig. 2 of the drawings.

Hooks 13 punched out of the web of the channeled ring at opposite sides of the point at which its inwardly bent edges adjoin, provide strong and durable means for the attachment of the coiled spring 14.

A bow-spring 15 which connects the opposite ends of the ring is riveted to the web of the same and provides a resilient hinge joint which permits of the expansion of the ring when its ends between which the cam is mounted are forced apart by the rotary movement of the same.

The spring 15 also provides a ready means for the application of a bolt 16 which extends through an opening in the cover 17 of the brake drum to hold the shoe against rotation, the flanges of the ring at opposite sides of the spring having been cut away as shown in Fig. 2, for the passage of the bolt.

The advantages of a shoe of the improved construction over the others will be readily understood.

Its channel form combines the utmost simplicity of construction with great strength and durability, it being observed that the inwardly projecting flanges are placed so as to directly oppose the strain to which the shoe is subject when forced into frictional contact with the drum. The flanges furthermore reinforce the shoe at the points at which its ends are bent inwardly for their engagement with the cam and breakage or binding of the parts of the shoe to which the force which moves them apart is directly applied, is thus effectively avoided.

The hooks 13 made integrally with the web of the ring provide inexpensive, strong and durable means for the attachment of the coiled spring, and the advantage of the use of malleable metal over cast metal in the production of shoes of the character described which are constantly subjected to wear and stress, will be readily understood.

Having thus described my invention what I claim and desire to secure by Letters-Patent is:

1. A brake-shoe of the character described comprising a ring made of bent metal of channel section, the flanges of which extend inwardly from its periphery, the ring being split crosswise and its end portions being bent inwardly to provide opposed faces for the engagement of an interposed cam, hooks punched out of the web of the ring at opposite sides of its split, and a spring attached to the hooks.

2. A brake-shoe of the character described comprising a ring made of bent metal of channel section, the flanges of which extend inwardly from its periphery, the ring being split crosswise and its end portions being bent inwardly to provide opposed faces for the engagement of an interposed cam, hooks formed integrally with the web of the ring at opposite sides of its split, and a spring attached to the hooks.

In testimony whereof I have affixed my signature.

CHARLES H. KEYES.